(12) United States Patent
Jiang et al.

(10) Patent No.: US 10,913,358 B2
(45) Date of Patent: Feb. 9, 2021

(54) PANTOGRAPH REMOTE CONTROL CIRCUIT FOR UNMANNED METRO TRAIN

(71) Applicant: CRRC Nanjing Puzhen Co., Ltd., Nanjing (CN)

(72) Inventors: Qiaofeng Jiang, Nanjing (CN); Xiaofang Shi, Nanjing (CN); Xianing Pan, Nanjing (CN); Li Yang, Nanjing (CN); Lian Ge, Nanjing (CN); Aiping Zhang, Nanjing (CN); Jianglong Chang, Nanjing (CN)

(73) Assignee: CRRC Nanjing Puzhen Co., Ltd., Nanjing (CN)

( * ) Notice: Subject to any disclaimer, the term of this patent is extended or adjusted under 35 U.S.C. 154(b) by 24 days.

(21) Appl. No.: 16/482,270

(22) PCT Filed: Sep. 27, 2018

(86) PCT No.: PCT/CN2018/107856
§ 371 (c)(1),
(2) Date: Jul. 31, 2019

(87) PCT Pub. No.: WO2020/037774
PCT Pub. Date: Feb. 27, 2020

(65) Prior Publication Data
US 2020/0398673 A1 Dec. 24, 2020

(30) Foreign Application Priority Data
Aug. 21, 2018 (CN) .......................... 2018 1 0952644

(51) Int. Cl.
*B60L 5/28* (2006.01)
*H02H 3/24* (2006.01)
*B60L 5/24* (2006.01)

(52) U.S. Cl.
CPC .................. *B60L 5/28* (2013.01); *H02H 3/24* (2013.01); *B60L 5/24* (2013.01)

(58) Field of Classification Search
CPC ...... B60L 5/28; B60L 5/24; B60L 5/42; B60L 3/0023; B60L 2240/547; B60L 50/53;
(Continued)

(56) References Cited

FOREIGN PATENT DOCUMENTS

| CN | 102963258 A | 3/2013 |
|---|---|---|
| CN | 103600663 A | 2/2014 |

(Continued)

*Primary Examiner* — Mark T Le
(74) *Attorney, Agent, or Firm* — Bayramoglu Law Offices LLC

(57) ABSTRACT

A pantograph remote control circuit for an unmanned metro train includes a startup circuit of an auxiliary inverter emergency start relay, a control circuit of an auxiliary inverter energized relay, and a startup circuit of a pantograph raising relay. A first normally-open contact pair of the pantograph raising relay is serially connected to a pantograph raising electromagnetic valve and then connected to an output terminal of a battery. At the meantime, the bootstrap is remotely controlled by the internal ATC wake-up module when the power supply is fed by the battery, and there is no need for the driver to operate on the spot, thereby saving time for the driver from operations and reducing the potential misoperation of the driver.

9 Claims, 1 Drawing Sheet

(58) Field of Classification Search
CPC ... B60L 1/04; B60L 3/003; B60L 5/00; B61C 17/12; H02J 7/0021; H02J 7/34; H02J 9/00; H02H 3/24; H02H 3/243; H01H 230/018; Y10T 307/516
See application file for complete search history.

(56) References Cited

FOREIGN PATENT DOCUMENTS

| | | | |
|---|---|---|---|
| CN | 106379174 A | | 2/2017 |
| CN | 106915259 A | | 7/2017 |
| CN | 107379983 A | | 11/2017 |
| JP | 2010-183802 | * | 8/2010 |
| JP | 2010183771 A | * | 8/2010 |
| JP | 2010183771 A | | 8/2010 |
| KR | 20090036071 A | * | 4/2009 |
| KR | 101150481 B1 | * | 5/2012 |

* cited by examiner

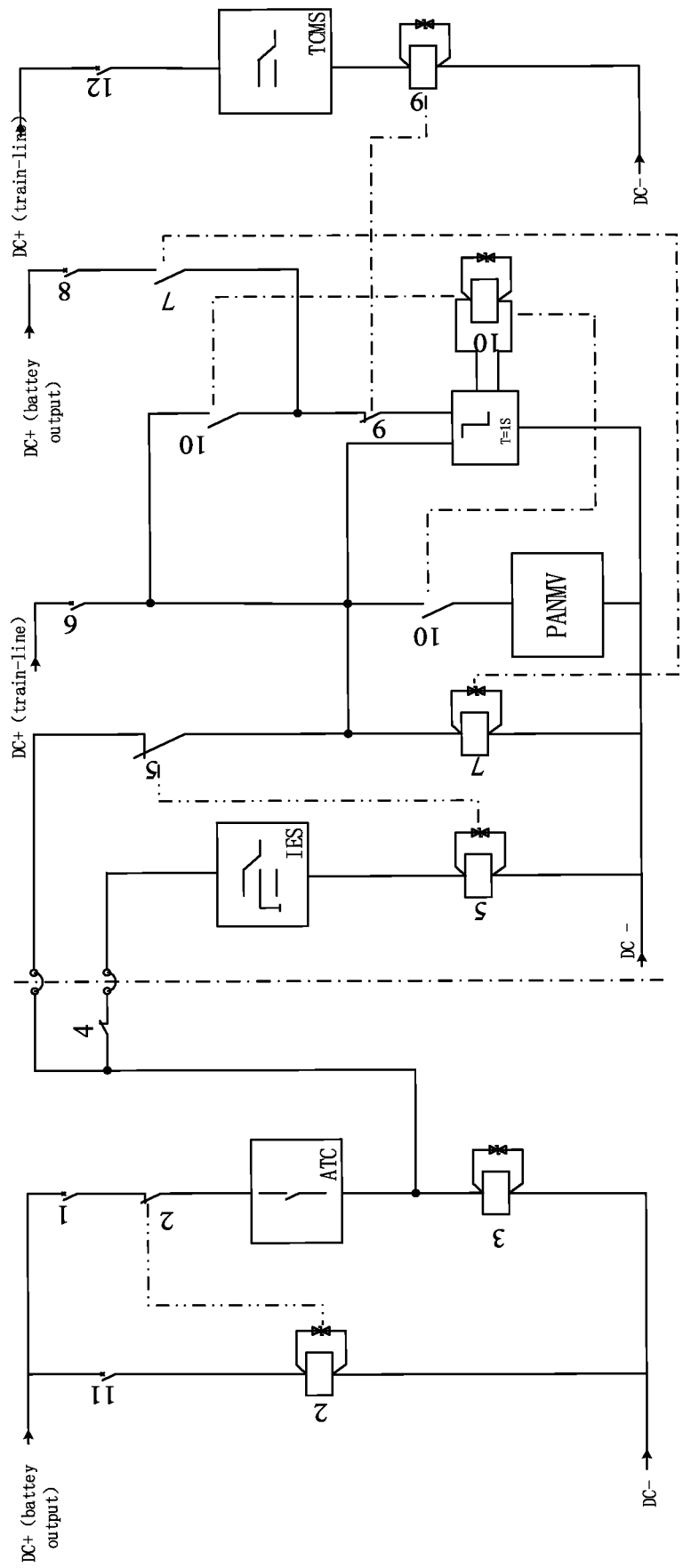

PANTOGRAPH REMOTE CONTROL CIRCUIT FOR UNMANNED METRO TRAIN

CROSS REFERENCE TO RELATED APPLICATIONS

This application is the national phase entry of International Application PCT/CN2018/107856, filed on Sep. 27, 2018 which is based upon and claims priority to Chinese Patent Application No. CN201810952644.9, filed on Aug. 21, 2018 the entire contents of which are incorporated herein by reference.

TECHNICAL FIELD

The present disclosure relates to the technical field of pantograph-catenary monitoring, and particularly to a pantograph remote control of a fully-automatic unmanned metro vehicle.

BACKGROUND

In a six-coach metro train, each coach of the train is mounted with two pantographs. DC110V control power supply is provided to raise the pantograph after the train is started, and a gas source is supplied by a main air cylinder or an auxiliary air cylinder of the train. When the control power supply fails, the driver needs to manually take emergency measures on the spot to solve the problem in raising the pantograph. With the rapid development of rail transit, fully-automatic unmanned trains are used in a growing number of metro lines. Therefore, the remote emergency control of pantographs for fully-automatic unmanned metro vehicles is an unavoidable problem in the research of rail vehicles.

In a manned metro vehicle, after the train is started, with a normal power supply of the battery and a normal main air cylinder pressure, the driver would manipulate multiple knobs or a switch to control the raising and lowering of the pantograph. When the main air cylinder pressure or the auxiliary air cylinder pressure is normal, and power supply is fed by the battery (generally, when the voltage is lower than 84 V and higher than 77 V), the driver needs to manipulate the two-position three-way valve on the pantograph raising air circuit board to isolate the electromagnetic valve on the pantograph raising air duct panel, so that the pantograph can be raised. Then, the bootstrap button is pressed down to start the auxiliary inverter and output DC110V, so that the train can be successfully started. However, since there is no driver to perform operations on the spot in a fully-automatic unmanned metro vehicle, the pantograph cannot be raised as usual with the power supply fed by the battery, so the train fails to get started and cannot achieve scheduled departure, thereby affecting the railway service. Therefore, a remote control circuit is imperative to raise the pantograph in an emergency.

The Chinese patent application CN 102963258 A discloses a control circuit for electrical pantographs which can address the problems of controlling a single pantograph or three pantographs in a centralized manner for the manned metro vehicle. However, such a solution is unable to meet the requirement of raising the pantograph in an emergency by remote control for fully-automatic unmanned metro vehicles.

SUMMARY

It is an objective of the present disclosure to provide a pantograph remote control circuit for unmanned metro train, aiming at the problem of failure to raise the pantograph and start the train with the power supply fed by the battery of the unmanned metro train. The control circuit is simple and easy to implement and can reduce the probability of driver's on-site operation for the fully-automatic unmanned metro train and realize automatic control for the pantograph raising.

To solve the above technical problems, the present disclosure provides a pantograph remote control circuit for the unmanned metro train which includes a startup circuit of an auxiliary inverter emergency start relay, a control circuit of an auxiliary inverter energized relay, and a startup circuit of a pantograph raising relay. A first normally-open contact pair of the pantograph raising relay is serially connected to a pantograph raising electromagnetic valve and then connected to an output terminal of a battery. The startup circuit of the auxiliary inverter emergency start relay includes a low-voltage detection relay connected to the output terminal of the battery, a normally-closed contact pair of the low-voltage detection relay serially connected to the output terminal of the battery, a normally-open contact pair of an automatic train control (ATC) wake-up module, and the auxiliary inverter emergency start relay. The control circuit of the auxiliary inverter energized relay is connected to the auxiliary inverter emergency start relay in parallel to form two parallel branches including a first branch where a traction box high-voltage isolator is serially connected to an inter-coach power detection relay and a second branch where the auxiliary inverter energized relay is serially connected to a normally-closed contact pair of the inter-coach power detection relay. The startup circuit of the pantograph raising relay includes a normally-open contact pair of the auxiliary inverter energized relay connected to the output terminal of the battery and a time delay switch, and the time delay switch is connected to the pantograph raising relay.

The present disclosure further proposes a pantograph remote control method for an unmanned metro train which includes the following steps:

de-energizing the low-voltage detection relay to make the normally-closed contact pair of the low-voltage detection relay closed when a voltage of the battery is detected to be lower than a working voltage, starting the ATC wake-up module and closing the normally-open contact pair of the ATC wake-up module to energize the auxiliary inverter emergency start relay (after the auxiliary inverter emergency start relay is energized, the corresponding auxiliary normally-open contact pair is closed, a built-in battery of the auxiliary inverter supplies power to the auxiliary inverter control board, and the auxiliary inverter can provide control power for the vehicle), and starting the auxiliary inverter to output the control power supply of the vehicle;

the traction box high-voltage isolator is disconnected at a pantograph position, the inter-coach power detection relay is not energized, and the normally-closed contact pair of the inter-coach power detection relay is closed to energize the auxiliary inverter energized relay, and the normally-open contact pair of the auxiliary inverter energized relay is closed;

since the vehicle is not waken up at this time and there is no vehicle control power supply, a pantograph lowering relay is not energized, a normally-closed contact pair of the pantograph lowering relay is closed, and the time delay switch is energized, so that the pantograph raising relay is energized, the first normally-closed contact pair of the pantograph raising relay is closed, the pantograph raising electromagnetic valve is energized, and the pantograph is raised.

Furthermore, the present disclosure also relates to an unmanned metro vehicle having the above-mentioned pantograph remote control circuit.

The present disclosure also relates to an unmanned metro vehicle, where the pantograph is remotely controlled by the pantograph remote control method when the voltage of the battery is lower than the working voltage.

The present disclosure can effectively avoid the probability of failure to activate and move the vehicle due to the power supply fed by the battery, thereby reducing the train rescue frequency and increasing the availability. In the meantime, the bootstrap is remotely controlled by the internal ATC wake-up module when the power supply is fed by the battery, and there is no need for the driver to operate on the spot, thereby saving time for the driver from operations and reducing the potential misoperation of the driver. The present disclosure is applicable in the pantograph control circuit of a fully-automatic unmanned vehicle in today's rail transit sector, and the pantograph can be raised in emergency by remote control without on-site manual intervention, thereby realizing the fully-automatic unmanned driving of the metro in real sense.

BRIEF DESCRIPTION OF THE DRAWINGS

FIG. 1 is a schematic diagram of a pantograph remote control circuit for an unmanned metro train.

DETAILED DESCRIPTION OF THE EMBODIMENTS

An embodiment of the present disclosure will be illustrated below with reference to the drawing.

As shown in FIG. 1, according to the present embodiment, the pantograph remote control circuit of the unmanned metro train includes a startup circuit of the auxiliary inverter emergency start relay 3, a control circuit of the auxiliary inverter energized relay 7, and a startup circuit of the pantograph raising relay 10.

The startup circuit of the auxiliary inverter emergency start relay 3 includes the low-voltage detection relay 2 connected to the output terminal of the battery, a normally-closed contact pair of the low-voltage detection relay serially connected to the output terminal of the battery, a normally-open contact pair of an automatic train control (ATC) wake-up module, and the auxiliary inverter emergency start relay 3.

The control circuit of the auxiliary inverter energized relay 7 is connected to the auxiliary inverter emergency start relay 3 in parallel to form two parallel branches including a first branch where a traction box high-voltage isolator IES is serially connected to an inter-coach power detection relay 5 and a second branch where the auxiliary inverter energized relay 7 is serially connected to a normally-closed contact pair of the inter-coach power detection relay. The startup circuit of the pantograph raising relay 10 further includes a TCMS pantograph raising and lowering switch and the pantograph lowering relay 9 which are serially connected to the control power supply of the vehicle, and the normally-open contact pair of the auxiliary inverter energized relay 7, the normally-closed contact pair of the pantograph lowering relay 9, and the time delay switch (in present embodiment, the delay of the time delay switch is 1 s) which are serially connected to the output end of the battery. The time delay switch is connected to the pantograph raising relay 10. As shown in FIG. 1, the pantograph raising relay 10 has two normally-open contact pairs, and the first normally-open contact pair of the pantograph raising relay 10 is serially connected to the pantograph raising electromagnetic valve PANMV and then connected to the output terminal of the battery. The two contacts of the second normally-open contact pair of the pantograph raising relay are respectively connected to the vehicle control power supply and the normally-closed contact pair of the pantograph lowering relay.

In present embodiment, lines connected to the positive electrode of the battery and lines connected to the positive electrode of the vehicle power supply are all provided with circuit breakers which are referred to as 1, 6, 8, 11, and 12 in the drawings.

The control circuit of the present embodiment is simple and easy to implement, and can reduce the probability of the driver's on-site operation for the fully-automatic unmanned metro train, so that the automatic pantograph raising control can be realized and it is more practical in the design of fully-automatic unmanned driving.

The method for remotely controlling the pantograph of the unmanned metro train by using the circuit described in the present embodiment includes the following steps:

de-energizing the low-voltage detection relay to make the normally-closed contact pair of the low-voltage detection relay closed when a voltage of the battery is detected to be lower than a working voltage, starting the ATC wake-up module and closing the normally-open contact pair of the ATC wake-up module to energize the auxiliary inverter emergency start relay, and starting the auxiliary inverter to output the vehicle control power;

after the auxiliary inverter emergency start relay is energized, the corresponding auxiliary normally-open contact pair is closed, a built-in battery of the auxiliary inverter supplies power to the auxiliary inverter control board, and the auxiliary inverter can provide control power for the vehicle;

the traction box high-voltage isolator is disconnected at a pantograph position, the inter-coach power detection relay is not energized, and the normally-closed contact pair of the inter-coach power detection relay is closed to energize the auxiliary inverter energized relay, and the normally-open contact pair of the auxiliary inverter energized relay is closed;

since the vehicle is not waken-up at this time and there is no vehicle control power supply, a pantograph lowering relay is not energized, a normally-closed contact pair of the pantograph lowering relay is closed, and the time delay switch is energized, so that the pantograph raising relay is energized, the first normally-closed contact pair of the pantograph raising relay is closed, the pantograph raising electromagnetic valve is energized, and the pantograph is raised.

When the pantograph raising relay is energized, the two contacts of the pantograph raising relay are respectively connected to the power supply output after the vehicle is waken-up and the second normally-closed contact pair of the pantograph lowering relay, and the second normally-closed contact pair of the pantograph lowering relay is closed. When the voltage of the battery reaches the working voltage, the low-voltage detection relay is de-energized and the normally-closed contact pair of the low-voltage detection relay is disconnected. As a result, the inter-coach power detection relay is de-energized, the normally-closed contact pair of the inter-coach power detection relay is disconnected, the auxiliary inverter energized relay is de-energized, power is supplied from the vehicle control power supply on a side of the second normally-closed contact pair of the pantograph raising relay by the pantograph raising relay to keep the pantograph raising electromagnetic valve energized.

When the train is waken up, the TCMS issues a pantograph lowering command, so the TCMS internal pantograph lowering switch is closed, the pantograph lowering relay is energized, and the normally-closed contact pair of the pantograph lowering relay is disconnected to cause de-energization of the pantograph raising electromagnetic valve, and the pantograph is retracted down.

In addition to the above embodiment, the present disclosure may also have other embodiments. Any technical solution derived from equivalent substitutions or equivalent modifications is still covered by the scope of the present disclosure.

What is claimed is:

1. A pantograph remote control circuit for an unmanned metro train, comprising:
   a startup circuit of an auxiliary inverter emergency start relay, a control circuit of an auxiliary inverter energized relay, and a startup circuit of a pantograph raising relay; wherein,
   a first normally-open contact pair of the pantograph raising relay is serially connected to a pantograph raising electromagnetic valve and then connected to an output terminal of a battery;
   the startup circuit of the auxiliary inverter emergency start relay comprises a low-voltage detection relay connected to the output terminal of the battery, a normally-closed contact pair of the low-voltage detection relay serially connected to the output terminal of the battery, a normally-open contact pair of an automatic train control (ATC) wake-up module, and the auxiliary inverter emergency start relay;
   the control circuit of the auxiliary inverter energized relay is connected to the auxiliary inverter emergency start relay in parallel to form two parallel branches comprising a first branch where a traction box high-voltage isolator is serially connected to an inter-coach power detection relay and a second branch where the auxiliary inverter energized relay is serially connected to a normally-closed contact pair of the inter-coach power detection relay; and
   the startup circuit of the pantograph raising relay comprises a normally-open contact pair of the auxiliary inverter energized relay connected to the output terminal of the battery and a time delay switch, and the time delay switch is connected to the pantograph raising relay.

2. The pantograph remote control circuit for an unmanned metro train as claimed in claim 1, wherein the startup circuit of the pantograph raising relay further comprises a TCMS pantograph raising and lowering switch and a pantograph lowering relay, the TCMS pantograph raising and lowering switch and the pantograph lowering relay are serially connected to a control power supply of the metro train, and a normally-closed contact pair of the pantograph lowering relay is serially connected between and the time delay switch and a normally-open contact pair of the auxiliary inverter energized relay.

3. The pantograph remote control circuit for an unmanned metro train as claimed in claim 2, wherein two contacts of a second normally-open contact pair of the pantograph raising relay are respectively connected to the control power supply of the metro train and the normally-closed contact pair of the pantograph lowering relay.

4. The pantograph remote control circuit for an unmanned metro train as claimed in claim 3, wherein lines connected to a positive electrode of the battery and lines connected to a positive electrode of a metro train power supply are all provided with circuit breakers.

5. A pantograph remote control method for an unmanned metro train, comprising: providing the pantograph remote control circuit as claimed in claim 1.

6. The pantograph remote control method for an unmanned metro train as claimed in claim 5, comprising:
   de-energizing the low-voltage detection relay to make the normally-closed contact pair of the low-voltage detection relay closed when a voltage of the battery is detected to be lower than a working voltage, starting the ATC wake-up module and closing the normally-open contact pair of the ATC wake-up module to energize the auxiliary inverter emergency start relay, and starting an auxiliary inverter to output the control power supply of the metro train;
   wherein, after the auxiliary inverter emergency start relay is energized, an auxiliary normally-open contact pair is closed, a built-in battery of the auxiliary inverter supplies power to an auxiliary inverter control board, and the auxiliary inverter is able to provide the control power supply for the metro train;
   the traction box high-voltage isolator is disconnected at a pantograph position, the inter-coach power detection relay is not energized, the normally-closed contact pair of the inter-coach power detection relay is closed to energize the auxiliary inverter energized relay, and the normally-open contact pair of the auxiliary inverter energized relay is closed; and
   since the metro train is not waken up at this time and there is no control power supply from the metro train, a pantograph lowering relay is not energized, a normally-closed contact pair of the pantograph lowering relay is closed, and the time delay switch is energized, so that the pantograph raising relay is energized, the first normally-closed contact pair of the pantograph raising relay is closed, the pantograph raising electromagnetic valve is energized, and the pantograph is raised.

7. The pantograph remote control method for an unmanned metro train as claimed in claim 6, wherein when the pantograph raising relay is energized, two contacts of the pantograph raising relay are respectively connected to the power supply output after the metro train is waken up and a second normally-closed contact pair of the pantograph lowering relay, and the second normally-closed contact pair of the pantograph lowering relay is closed; and
   when the voltage of the battery reaches the working voltage, the low-voltage detection relay is de-energized and the normally-closed contact pair of the low-voltage detection relay is disconnected, the inter-coach power detection relay is de-energized, the normally-closed contact pair of the inter-coach power detection relay is disconnected, the auxiliary inverter energized relay is de-energized, power is supplied from the vehicle control power supply on a side of the second normally-closed contact pair of the pantograph raising relay by the pantograph raising relay to keep the pantograph raising electromagnetic valve energized.

8. The pantograph remote control method for an unmanned metro train as claimed in claim 7, wherein when the metro train is waken up, the TCMS issues a pantograph lowering command, so a TCMS internal pantograph lowering switch is closed, the pantograph lowering relay is energized, and the normally-closed contact pair of the pantograph lowering relay is disconnected to cause de-energization of the pantograph raising electromagnetic valve, and the pantograph is retracted down.

9. An unmanned metro train, wherein the unmanned metro train comprises the pantograph remote control circuit as claimed in claim 1.

* * * * *